United States Patent Office 3,211,287
Patented Oct. 12, 1965

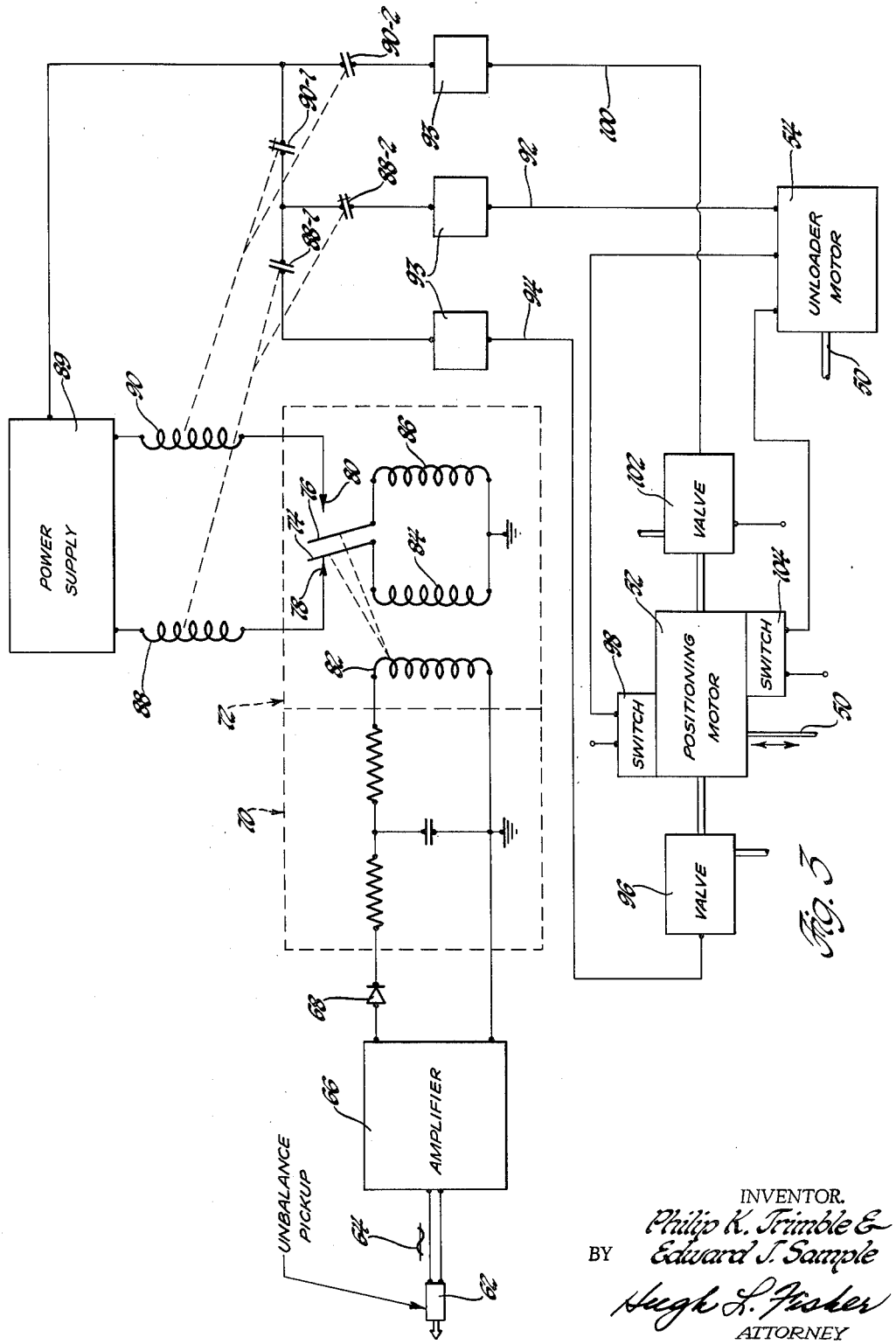

3,211,287
BALANCING SYSTEMS
Philip K. Trimble, Rochester, and Edward J. Sample, Warren, Mich., assignors to General Motors Corporation, Detroit, Mich., a corporation of Delaware
Filed Dec. 3, 1962, Ser. No. 241,833
4 Claims. (Cl. 209—74)

This invention relates to method and apparatus for inspecting and distributing parts. More particularly, the invention concerns inspection and distribution systems adapted for use, although not exclusively, with balancing machines.

The quality of dynamic balancing obtained from various machines will vary for different reasons. Usually the machine is calibrated so that the amount of unbalance remaining in a balanced part is within some predetermined range. If the final amount of unbalance is excessive, the workpiece is unacceptable and hence, is rejected. On the other hand, there may be no unbalance or it may be slight, and therefore, this workpiece would be of exceptional or premium quality.

It is proposed therefore to provide a novel system for first, measuring a characteristic of a workpiece; thereafter, evaluating the workpiece for grade of quality; and finally, distributing the workpiece in accordance with the grade of quality.

More specifically, unique method and apparatus are proposed for, first, determining the amount of unbalance remaining in previously balanced workpieces; next, evaluating the workpieces in accordance with the amount of unbalance so as to determine whether the workpieces are unacceptable of acceptable, and if acceptable, the grade of acceptance; and finally, distributing the workpieces in accordance with this evaluation.

It is a further purpose of the invention to provide apparatus that at one station measures the amount of unbalance remaining in a previously balanced workpiece and at a subsequent station evaluates and distributes the workpiece in accordance with the amount of unbalance remaining, i.e., whether the workpiece is of unacceptable, acceptable, or highly acceptable quality.

The foregoing and other objects and advantages of the invention will be apparent from the following description and from the accompanying drawings in which:

FIGURE 3 is a circuit diagram of a control system for the FIGURE 1 apparatus.

Figure 1:
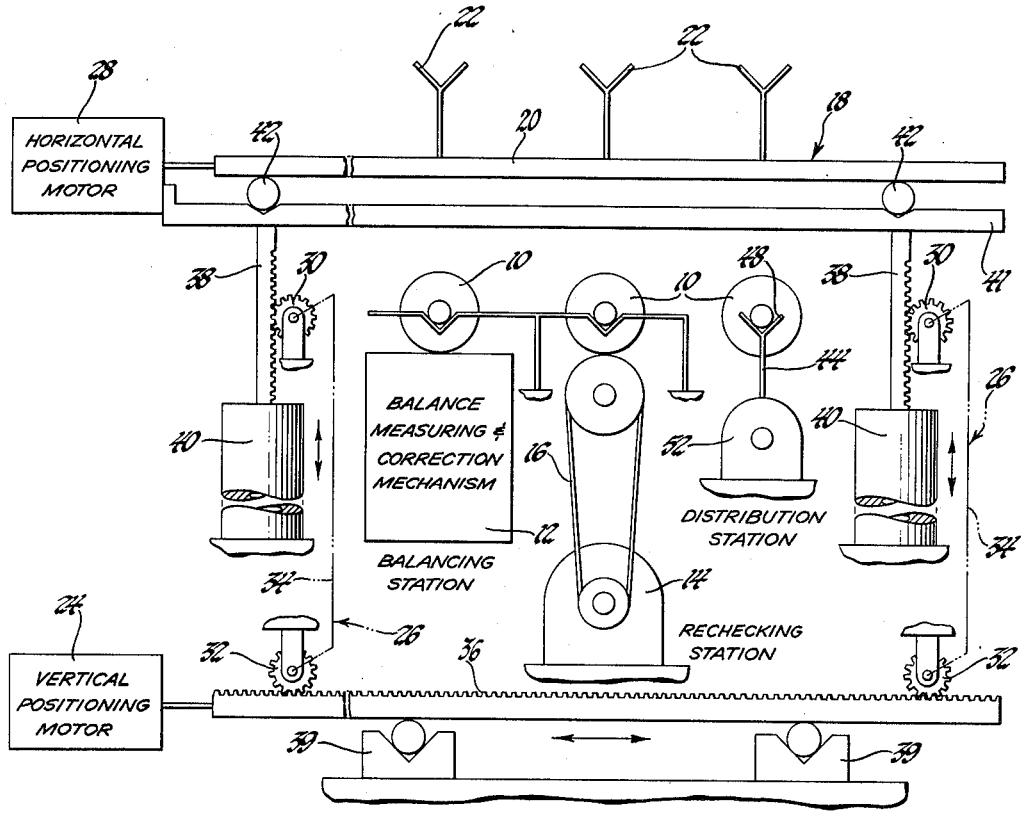
FIGURE 1 is a schematic showing of apparatus utilized to demonstrate the invention.

Referring now to the drawings in detail and initially to FIGURE 1, the numeral 10 designates generally a workpiece that is to be dynamically balanced. The workpiece 10 proceeds successively from the designated stations, i.e., from a balancing station to a rechecking station, and then to a distribution station. There may be other stations prior to the balancing station as will be appreciated by those versed in the art. At the balancing station, an appropriate balance measuring and correction mechanism 12 corrects for the unbalance in the workpiece 10 either by removal or by addition of material. While at the rechecking station, the workpiece 10 is re-inspected for unbalance to determine how much remains, if any. The rechecking station includes a motor 14, which through a belt and pulley drive 16 revolves the workpiece 10 at the proper balancing speed for this unbalance measurement. The distribution station uses the information obtained at the rechecking station for distributing the workpieces 10 in accordance with their grade of quality as will be explained.

The movement of the workpiece 10 between stations is accomplished by a transfer mechanism denoted generally at 18. The transfer mechanism 18 includes a carriage 20 on which are arranged a series of fork shaped supports 22, which are arranged to embrace the workpiece 10 at the spindle ends on each side. The carriage 20 is moved up and down or vertically by a vertical positioning motor 24 through rack and pinion mechanisms viewed generally at 26 and fore and aft or horizontally by a horizontal positioning motor 28. The motors 24 and 28 may be of any known type.

In operation, the carriage 20 actually traverses a rectangular shaped path. For instance, the carriage 20 is initially moved upwardly. During this upward movement, the supports 22 embrace the spindle ends of the workpiece 10 and maneuver the workpiece 10 upwardly and away from the station in which it is located. Next, the carriage 20 moves the workpiece 10 forwardly until opposite the next station and then lowers the workpiece 10 into position at this station. The carriage 20 continues downwardly until the support 22 is separated from or below the workpiece spindle ends. The carriage 20 now returns to the starting position, moving horizontally and leftwardly as viewed in FIGURE 1.

The rack and pinion mechanisms 26 each have rotatably mounted pinions 30 and 32 and a drive connecting linkage 34. The pinion 32 engages an elongated horizontal rack 36, whereas the pinion 30 engages a vertical rack 38. The elongated rack 36 is positioned on bearings 39 and is moved back and forth or horizontally by the vertical positioning motor 24. This movement of the elongated rack 36 revolves the pinion 32, which in turn through the linkage 34 revolves the pinion 30 in the same direction. The vertical rack 38 at the lower end is guidably positioned within a column 40 and at the upper end has joined thereto a guideway 41. The guideway 41 has bearings 42 for permitting the carriage 20 to be moved horizontally or fore and aft by the horizontal positioning motor 28.

If the transfer mechanism 18 is at the aforementioned starting position, the described rectangular shaped path is developed by the following sequence of events. First, the vertical positioning motor 24 moves the elongated rack 36 to the left, as viewed in FIGURE 1. Consequently, both the pinions 32 and the pinions 30 are revolved clockwise. This direction of rotation will move the vertical rack 38 and accordingly the carriage 20 upwardly. The horizontal positioning motor 28 then operates to move the carriage 20 to the right. At this time, the vertical positioning motor 24 will move the elongated rack to the right and revolve the pinions 30 and 32 counterclockwise so that the carriage 20 is moved downwardly. Again, the horizontal positioning motor 28 becomes operative and moves the carriage 20 to the left and back to the starting position. This sequential operation of the motors 24 and 28 can be obtained in any suitable way as will be understood by those versed in the art.

Figure 2:
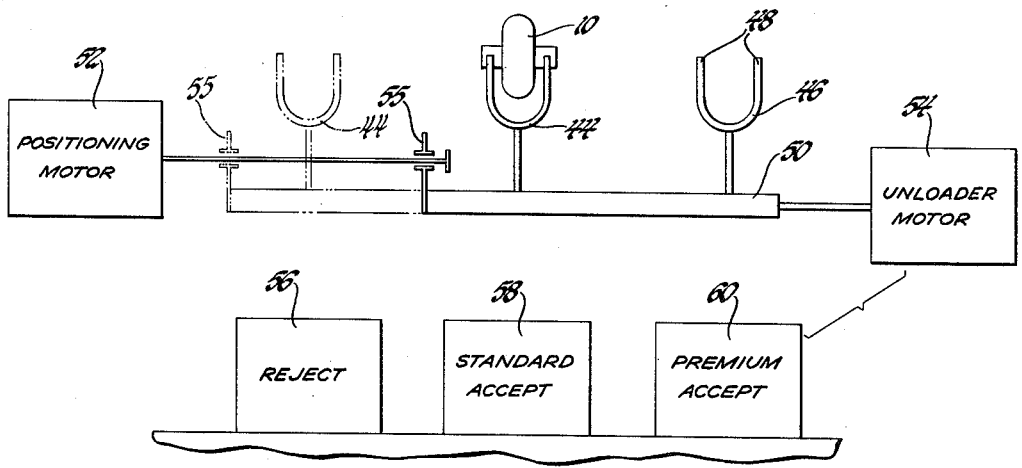
FIGURE 2 is a schematic illustration of a positioning and unloading arrangement employed by the FIGURE 1 apparatus.

Considering now FIGURE 2, the distribution station includes two cradles 44 and 46, each of which is U-shaped with fork-shaped terminal ends at 48 as seen in FIGURE 1. The cradles 44 and 46 are secured to a shiftable and revolvably supported spindle 50. This spindle 50 is shifted between the depicted broken line and the solid line positions by a positioning motor 52, which may be of the piston type, and is revolved clockwise from the FIGURE 1 position until the workpiece 10 falls from whichever cradle 44 or 46 it is in at the time an unloading motor 54 is actuated. An arcuate slot connection 55 or something equivalent can be employed for permitting the spindle 50 to be revolved without interfering with the operation of the motor 52. When the workpiece 10 falls, it will drop into either a reject bin 56, a standard-accept bin 58, or a premium-accept bin 60, as determined by which bin the workpiece 10 has been aligned by the positioning motor 52. These bins 56, 58, and 60 are merely exemplary; conveyors or other equivalents may be used.

The positioning motor 52 and the unloader motor 54 are controlled by the FIGURE 3 system. As can be observed, an unbalance pickup 62 suitably operated, e.g., magnetically or capacitively, is arranged at the rechecking station relative to the rotating workpiece 10 so as to develop an unbalance signal 64 of sinusoidal wave form, if there is any unbalance remaining in the workpiece 10 after being corrected at the balancing station. The amplitude of the unbalance signal 64 represents the actual amount of the remaining unbalance. This unbalance signal 64 is increased in strength if necessary by an amplifier 66 and then transferred successively through a rectifier 68 and a filtering network 70 where the unbalance signal 64 is converted into a D.C. signal and to a contact meter 72. The contact meter 72 is a conventional D.C. meter and includes a pair of movable indicating needle contacts 74 and 76 that coact respectively with fixed premium and reject contacts 78 and 80. The contact meter 72 has a sensing coil 82 to which the D.C. unbalance signal 64 is applied. The energization of the sensing coil 82, in effect, causes it to rotate relative to a permanent magnet (not shown) and accordingly rotate the movable contacts 74 and 76. Locking coils 84 and 86 are so wound as to increase the engaging pressure between the contacts after initial contact is made.

If the D.C. level of the rectified and filtered unbalance signal 64 is some predetermined minimum indicating that there is little or no unbalance remaining in the workpiece 10, the movable contact 74 will engage the premium fixed contact 78 and complete a circuit extending through a premium relay 88 to some suitable voltage source as a power supply 89; on the other hand, if the D.C. level of the rectified unbalance signal 64 exceeds some predetermined amount indicating that the unbalance is excessive, the movable contact 76 will engage the reject contact 80 and cause a reject relay 90 to be energized. The premium and reject relays 88 and 90 control, respectively, normally opened contacts 88–1 and normally closed contacts 88–2 and normally closed contacts 90–1 and normally open contacts 90–2.

With these contacts having the FIGURE 3 status, a standard-accept circuit 92 is completed between the power supply 89 and the unloader motor 54 after a predetermined time interval adequate for the workpiece 10 to be transferred from the rechecking station to the distribution station. This time interval is provided by a time delay mechanism 93 of any known construction. When the circuit 92 is completed, the unloader motor 54 is rendered operative and will revolve the spindle 50 as previously explained.

When the premium relay 88 is energized, the contacts 88–1 close and the contacts 88–2 open. This completes a premium-accept circuit 94 after the elapse of the time interval established by the time delay mechanism 93. As a consequence, a valve 96 of conventional construction is operated so that fluid pressure is supplied to the positioning motor 52. When fluid pressure is supplied by the valve 96, the positioning motor 52 will shift the spindle 50 to the FIGURE 2 position. In this position, a switch 98 is operated and the unloader motor 54 is again energized to rotate the spindle 50.

When the reject relay 90 is energized, the closed contacts 90–1 open and the open contacts 90–2 close. Consequently, a reject circuit 100 is completed, again after the delay determined by the time delay mechanism 93. The completion of the circuit 100 causes valve 102 similar to valve 96 to be operated and the applied fluid pressure will cause the positioning motor 52 to maneuver the spindle 50 to the broken line FIGURE 2 position. When in this latter position, a switch 104 is operated and the unloader motor 54 is again energized to revolve the spindle 50.

Summarizing the operation, if at the rechecking station it is ascertained that the workpiece 10 has an excessive amount of unbalance, the unbalance signal 64 developed by the unbalance pickup 62 will when applied to the contact meter 72 cause the movable contact 76 to engage the fixed contact 80 and energize the reject relay 90. Hence, the contacts 90–1 and 90–2 will be respectively opened and closed and the reject circuit 100 completed after the mentioned time delay controlled by the time delay mechanism 93. This time delay will permit the workpiece 10 to be installed in the cradle 44 as shown in FIGURE 2. Then the positioning motor 52 will shift the cradle 44 to the broken line position in FIGURE 2. The switch 104 will be closed and the unloader motor 54 energized. When the unloader motor 54 is energized, it will rotate the spindle 50 and the workpiece 10 of reject quality will be dropped into the reject bin 56.

If the next workpiece 10 is determined to be of standard-accept quality, i.e., its unbalance is within allowable limits, both of the movable contacts 74 and 76 will assume a position intermediate the premium and reject fixed contacts 78 and 80. Consequently, both the premium and reject relays 88 and 90 will be deenergized and all the contacts will have the indicated status. With this status and after the time delay mechanism 93 operates, the standard-accept circuit will be completed and the unloader motor 54 energized immediately to rotate the spindle 50. Since the spindle 50 will have been moved over to the broken line position, the workpiece 10 will have been deposited in the cradle 46. However, this cradle 46 is in proper alignment with the standard-accept bin 58 and the workpiece 10 of standard-accept quality will be dropped into it.

It should be mentioned here that the reason the unloader motor 54 is energized immediately by the standard-accept circuit 92 except for the time delay, is that regardless of the position of the spindle 50 either cradle 44 or 46 will always be opposite the standard-accept bin 58.

It will now be assumed that the next workpiece 10 is of premium quality and consequently the D.C. level of the unbalance signal 64 determined at the rechecking station will be minimum. Therefore, the movable contact 74 will engage the premium fixed contact 78 as displayed in FIGURE 3. This causes the premium relay 88 to be energized and accordingly the contacts 88–1 and 88–2 to be respectively closed and opened. Before the time delay mechanism 93 has timed out, the premium workpice 10 will have been deposited in the cradle 46 by the transfer mechanism 18. Then when the premium-standard circuit 94 is completed, the valve 96 is actuated, and the positioning motor 52 will move the spindle 50 from the broken line position to the solid line position portrayed in FIGURE 2. In this position, switch 98 is closed and the unloader motor 54 will be energized and revolve the spindle 50 so that the premium workpiece 10 will be dropped into the premium-accept bin 60.

From the foregoing, it will be appreciated that the method and apparatus evaluate previously balanced workpieces according to quality and then distribute the workpieces accordingly. If thereafter a premium quality workpiece 10 is required, it is readily available.

This invention is to be limited only by the following claims:

1. In balancing apparatus; the combination of means measuring the amount of unbalance in a workpiece and means distributing the workpiece as determined by whether the amount of unbalance renders the workpiece unacceptable or acceptable and the grade of acceptance; the distributing means having a plurality of workpiece receiving locations including a premium-accept location for workpieces with a predetermined minimum amount of unbalance, a reject location for unacceptable workpieces having an amount of unbalance that exceeds a predetermined maximum, a standard-accept location for workpieces having an amount of unbalance between the predetermined minimum and the predetermined maximum, a workpiece holder adapted to receive the workpiece whose unbalance has been determined by the measuring means, the holder being movable relative to the locations so as to position the workpiece adjacent the location corresponding to the amount of unbalance in the workpiece and also maneuverable to unload the workpiece at the corresponding location, a positioning motor operative to position the holder relative to the locations, an unloader motor operative to maneuver the holder, means responsive to the amount of unbalance in the workpiece, a series of motor operating circuits controlled by the responsive means, the series of circuits including a reject circuit rendered operative by the responsive means when the amount of unbalance in the workpiece exceeds the predetermined maximum to cause the positioning motor to position the holder so that the workpiece is adjacent the reject location, a standard-accept circuit rendered operative by the responsive means when the amount of unbalance in the workpiece is between the predetermined minimum and the predetermined maximum to cause the unloader motor to maneuver the holder and cause the workpiece to be placed in the standard-accept location, and a premium-standard circuit rendered operative by the responsive means when the amount of unbalance in the workpiece is less than the predetermined minimum to cause the positioning motor to position the holder so that the workpiece is adjacent the premium-standard location, and means rendered operative when the workpiece is in the reject and the premium-standard locations to cause the unloader motor to maneuver the holder so as to place the workpiece in the corresponding location.

2. In balancing apparatus; the combination of means measuring the amount of unbalance in a workpiece and means distributing the workpiece as determined by whether the amount of unbalance renders the workpiece unacceptable or acceptable and the grade of acceptance; the distributing means having a plurality of workpiece receiving locations including a premium-accept location for workpieces with a predetermined minimum amount of unbalance, a reject location for unacceptable workpieces having an amount of unbalance that exceeds a predetermined maximum, a standard-accept location for workpieces having an amount of unbalance between the predetermined minimum and the predetermined maximum, the standard-accept location being positioned between the premium-accept and reject locations, a holder having a pair of workpiece supports spaced apart thereon and adapted to have a workpiece whose unbalance has been determined by the measuring means to be received by one of the pair of supports, the holder being operable so that the one of the pair of supports is positioned adjacent the location corresponding to the amount of unbalance in the workpiece and then is maneuverable to unload the workpiece at the corresponding location, a positioning motor operative to position the holder, an unloader motor operative to maneuver the holder, means responsive to the amount of unbalance in the workpiece, a series of motor operating circuits controlled by the responsive means, the series of circuits including a reject circuit rendered operative by the responsive means when the amount of unbalance in the workpiece exceeds the predetermined maximum to cause the positioning motor to position the holder so that the workpiece is adjacent the reject location, a standard-accept circuit rendered operative by the responsive means when the amount of unbalance in the workpiece is between the predetermined minimum and the predetermined maximum to cause the unloader motor to maneuver the holder and cause the workpiece to be placed in the standard-accept location, and a premium-standard circuit rendered operative by the responsive means when the amount of unbalance in the workpiece is less than the predetermined minimum to cause the positioning motor to position the holder so that the workpiece is adjacent the premium-standard location, and means rendered operative when the workpiece is adjacent the reject and the premium-standard locations to cause the unloader motor to maneuver the holder so as to place the workpiece in the corresponding location.

3. In balancing apparatus having a measuring station and a distribution station; the combination of means measuring the amount of unbalance in a workpiece at the measuring station; means transferring the workpiece from the measuring station to the distribution station; and means distributing the workpiece at the distribution station as determined by whether the amount of unbalance renders the workpiece unacceptable or acceptable and the grade of acceptance; the distributing means having a plurality of aligned and spaced workpiece receiving locations including a premium-accept location for workpieces with a predetermined minimum amount of unbalance, a reject location for unacceptable workpieces having an amount of unbalance that exceeds a predetermined maximum, and a standard-accept location for workpieces having an amount of unbalance between the predetermined minimum and the predetermined maximum, the standard-accept location being positioned between the premium-accept and reject locations, a holder having a pair of spaced-apart workpiece supports thereon and arranged relative to the measuring station so that a workpiece is transferred to one of the pair of supports by the transferring means, the holder being operable so that the one of the pair of supports is positioned adjacent the location corresponding to the amount of unbalance in the workpiece and then is maneuvered so that the workpiece is placed at the corresponding location, a positioning motor operative to position the holder, an unloader motor operative to maneuver the holder, means responsive to the amount of unbalance in the workpiece, a series of motor operating circuits controlled by the responsive means, the series of motor operating circuits including a reject circuit rendered operative by the responsive means when the amount of unbalance in the workpiece exceeds the predetermined maximum to cause the positioning motor to position the holder so that the workpiece is adjacent the reject location, a standard-accept circuit rendered operative by the responsive means when the amount of unbalance in the workpiece is between the predetermined minimum and the predetermined maximum to cause the unloader motor to maneuver the holder and cause the workpiece to be placed in the standard-accept location, and a premium-standard circuit rendered operative by the responsive means when the amount of unbalance in the workpiece is less than the predetermined minimum to cause the positioning motor to position the holder so that the workpiece is adjacent the premium-standard location, and means rendered operative when the workpiece is adjacent the reject and the premium-standard locations to cause the unloader motor to maneuver the holder so as to place the workpiece in the corresponding location.

4. In balancing apparatus having a measuring station and a distribution station; the combination of means measuring the amount of unbalance in a workpiece at the measuring station and developing a corresponding electrical output; means transferring the workpiece from the measuring station to the distribution station; and means distributing the workpiece at the distribution station in accordance with the amount of unbalance; the distributing means including a reject receptacle for unacceptable workpieces having an unbalance that exceeds a predetermined amount, a premium-accept receptacle for workpieces having less than a predetermined minimum amount of unbalance, a standard-accept receptacle for workpieces having an amount of unbalance between the predetermined maximum and the predetermined minimum, the receptacles being aligned and spaced apart with the standard-accept receptacle positioned between the reject and the premium-accept receptacles, a holder having a pair of workpiece supports spaced apart thereon and arranged relative to the measuring station so that a workpiece is transferred to one of the pair of supports by the transferring means, the holder being shiftable relative to the receptacles so that the one of the pair of supports is positioned adjacent the receptacle corresponding to the amount of unbalance in the workpiece and rotatable to place the workpiece in the corresponding receptacle, an unloader motor operative to rotate the holder, a positioning motor operative to shift the holder, evaluating means responsive to the electrical output from the measuring means for judging the workpieces in accordance with the amount of unbalance therein, a premium-standard circuit rendered operative by the evaluating means when the unbalance in the workpiece is less than the predetermined minimum to cause the positioning motor to position the holder so that the workpiece is adjacent the premium-accept receptacle, a reject circuit rendered operative by the evaluating means when the amount of unbalance in the workpiece exceeds the predetermined maximum to position the holder so that the workpiece is adjacent the reject receptacle, a standard-accept circuit rendered operative by the evaluating means when the amount of unbalance in the workpiece is between the predetermined minimum and the predetermined maximum to cause the unloader motor to place the workpiece in the standard-accept receptacle, and means rendered operative when the workpiece is adjacent the premium-standard and the reject receptacles to render the unloader motor operative to place the workpiece in the corresponding station.

References Cited by the Examiner
UNITED STATES PATENTS

| | | | |
|---|---|---|---|
| 2,344,596 | 3/44 | Carmina | 209—74 X |
| 3,024,661 | 3/62 | Fibikar | 73—466 |

ROBERT B. REEVES, *Primary Examiner.*

SAMUEL F. COLEMAN, *Examiner.*